United States Patent
Haden, Jr. et al.

[15] 3,663,165

[45] *May 16, 1972

[54] ZEOLITIC CATALYST AND PREPARATION

[72] Inventors: Walter L. Haden, Jr., Metuchen; Frank J. Dzierzanowski, Somerset, both of N.J.

[73] Assignee: Engelhard Minerals & Chemicals Corporation, Woodbridge, N.J.

[ * ] Notice: The portion of the term of this patent subsequent to Apr. 14, 1987, has been disclaimed.

[22] Filed: Feb. 9, 1970

[21] Appl. No.: 10,005

Related U.S. Application Data

[63] Continuation-in-part of Ser. Nos. 738,384, June 20, 1968, Pat. No. 3,506,594, and Ser. No. 810,325, Mar. 25, 1969, and Ser. No. 856,458, Sept. 9, 1969, said Ser. No. 738,384, is a continuation-in-part of Ser. No. 698,400, Jan. 17, 1968, Pat. No. 3,503,900, and Ser. No. 416,925, Dec. 8, 1964, Pat. No. 3,391,994.

[52] U.S. Cl. ............................................23/112, 252/455 Z
[51] Int. Cl. ...................................C01b 33/23, B01j 11/40
[58] Field of Search................................................252/455 Z; 23/111–113

[56] References Cited

UNITED STATES PATENTS

| | | |
|---|---|---|
| 3,515,684 | 6/1970 | McEvoy..............................252/455 |
| 3,532,459 | 10/1970 | McEvoy et al.......................23/112 |
| 3,119,659 | 6/1964 | Taggart et al........................23/112 |
| 3,338,672 | 8/1967 | Haden, Jr. et al....................23/112 |
| 3,433,587 | 3/1969 | Haden, Jr. et al....................23/112 |
| 3,492,089 | 1/1970 | Vesely................................23/112 |

*Primary Examiner*—C. F. Dees
*Attorney*—Melvin C. Flint and Inez L. Moselle

[57] ABSTRACT

Preformed coherent microspheres obtained by calcining a spray dried slurry of hydrated kaolin clay at elevated temperature (e.g., 1800° F.) are suspended in an aqueous sodium hydroxide solution together with a small amount of finely divided metakaolin (e.g., kaolin clay calcined at 1350° F.). The suspension is aged and then heated until crystalline sodium faujasite appears in the microspheres and a sodium silicate mother liquor is formed. The crystallized microspheres are ion-exchanged to produce a fluid zeolitic cracking catalyst.

7 Claims, No Drawings

ZEOLITIC CATALYST AND PREPARATION

RELATED APPLICATIONS

This application is a continuation-in-part of the following copending U. S. patent applications of W. L. Haden, Jr. and F. J. Dzierzanowski: Ser. No. 738,384, filed June 20, 1968, now U.S. Pat. No. 3,506,594; Ser. No. 810,325, filed Mar. 25, 1969, and Ser. No. 856,458, filed Sept. 9, 1969. Application Ser. No. 738,384 in turn is a continuation-in-part of copending application Ser. No. 698,400, filed Jan. 17, 1968, now U.S. Pat. No. 3,503,900 and of Ser. No. 416,925, filed Dec. 8, 1964 now U.S. Pat. No. 3,391,994, issued July 9, 1968.

BACKGROUND OF THE INVENTION

U. S. patent application Ser. No. 738,384 describes a process for making a fluid zeolitic molecular sieve cracking catalyst from preformed microspheres composed of calcined kaolin clay. The microspheres are obtained by mixing water, raw (hydrated) kaolin clay (or a mixture of hydrated and calcined kaolin clay) to form a sprayable slurry. The slurry is spray dried, thereby forming microspheres which are calcined at a temperature and for a time sufficient to harden the microspheres and to cause the hydrated clay in the microspheres to undergo or pass through the characteristic kaolin exotherm after the clay is dehydrated. The calcined clay microspheres are subsequently slurried in an aqueous sodium hydroxide solution to form a suspension. This suspension is aged and thereafter heated at higher temperature under agitation until faujasite crystallizes. During the processing, a substantial proportion of the silica in the microspheres is extracted from the microspheres, forming a sodium silicate mother liquor. After reaction and recrystallization, the crystallized microspheres are separated from at least a portion of the mother liquid and the microspheres are subjected to an ion-exchange reaction to replace exchangeable sodium ions with nonalkali cations such as ammonium ions. Before or during use, the microspheres are steamed or calcined in air.

The catalytic properties of catalysts obtained by this method are affected by the proportion of zeolite in the composition as well as the $SiO_2/Al_2O_3$ ratio of the zeolite. Generally, a high $SiO_2/Al_2O_3$ ratio, e.g., 4/1 or above, is desired. For some applications a small proportion of zeolite, e.g., 5 percent, may be sufficient. For others, higher proportions of zeolite, for example, up to 70 percent, are desired. When employing the high temperature calcined microspheres as the sole source of silica and alumina reactants to produce the zeolite, difficulty may be experienced in crystallizing a sufficient quantity of faujasite having a high $SiO_2/Al_2O_3$ ratio. This is especially true when calcination temperatures have been severe or when temperature fluctuates during calcination, causing partial over-calcination.

It has been found that such difficulties may be obviated by providing metakaolin and high temperature calcined kaolin clay in separate microspheres, suspending the mixture of microspheres in caustic solution, and then aging and crystallizing faujasite. Reference is made to copending application Ser. No. 810,325.

THE INVENTION

This invention results from the discovery that it is beneficial to incorporate a small amount of powdered metakaolin with preformed microspheres composed of the high temperature calcined kaolin clay when carrying out the process described in Ser. No. 738,384.

Briefly stated, in accordance with the present invention, a composite zeolitic molecular sieve catalyst in the form of attrition-resistant microspheres is prepared by suspending in aqueous sodium hydroxide solution a mixture of powdered metakaolin and a larger amount of coherent spray dried microspheres composed of calcined kaolin clay which has undergone the characteristic kaolin exotherm, the microspheres being substantially free from hydrated kaolin clay. The suspension is aged and then maintained at elevated temperature while it is agitated until crystalline faujasite is present in the microspheres in the suspension and a sodium silicate mother liquor is formed. The zeolitic microspheres are then separated from at least a portion of the mother liquid and powdered solids that may be present.

The crystalline microspheres are ion-exchanged to replace sodium ions with suitable cations, the selection of which is within the skill of the art. Prior to use or during use, the ion-exchanged microspheres are thermally activated.

By including powdered metakaolin with the calcined clay microspheres in the reaction mixture, in accordance with this invention, the attrition resistance of the microspherical crystalline product may be improved to a remarkable extent. Especially when the clay has passed completely through the kaolin exotherm during calcination of the microspheres, the percentage of synthetic crystalline faujasite in the product may be increased.

From the brief description of the present invention, it is apparent that the process features the use of metakaolin in the form of a powder along with a different form of calcined clay in the form of microspherical particles. Although one of the solid reactants is a powder and the other is in the form of hard microspheres, the ultimate product is obtained in essentially the same size and form as the microspherical reactant.

By introducing the metakaolin into the reaction mixture in the form of a powder, we avoid difficulties that would be encountered in attempts to provide hard microspheres, all of which contain a mixture of metakaolin and calcined clay which has undergone the exotherm in suitable proportions. This may be explained by the fact that in order to obtain sufficiently attrition-resistant microspheres by spray drying kaolin clay and calcining the spray dried product to harden the microspheres, a substantial proportion of the clay material in the feed to the spray dryer must be uncalcined (hydrated) kaolin clay. If all of the clay which is spray dried to produce the microspheres is hydrated and the microspheres are calcined under conditions which are suitable for the preparation of metakaolin, the microspheres will not contain clay which has undergone the kaolin exotherm and faujasite will not crystallize when the microspheres are reacted in caustic solution. Moreover, the microspheres will lack the desired hardness. On the other hand, if calcination of microspheres consisting of hydrated kaolin clay is carried out under conditions which would be expected to cause the kaolin to undergo or pass through the exotherm, it will be difficult or impossible to control the reaction so that a portion of the calcined clay in the microspheres remains in the form of metakaolin. Similar difficulties will be experienced if the microspheres are produced by spray drying mixtures of hydrated kaolin clay and calcined clay(s) when such mixtures include sufficient hydrated clay to provide the desired hardness. Obviously, if metakaolin and calcined clay which has undergone the exotherm are both employed as powders, the crystallized product will not be obtained in the desired form of microspheres.

DETAILED DESCRIPTION

Metakaolin and its preparation are described in U. S. Pat. No. 3,338,672 to Haden et al. Briefly, pure metakaolin is an essentially amorphous, anhydrous form of calcined kaolin clay which has an empirical formula of approximately $Al_2O_3 \cdot 2SiO_2$. It may be obtained by calcining hydrated kaolin clay at a temperature within the range of about 1,000° to 1,500° F., usually about 1,350° to 1,400° F. When subjected to conventional differential thermal analysis (DTA), metakaolin exhibits the characteristic kaolin exotherm peak at about 1,800° F. However, the DTA pattern of metakaolin does not exhibit the characteristic endothermic peak which is associated with loss of water from crystals of kaolin clay. Preferably the metakaolin is obtained by calcining hydrated kaolin clay supplied in the form of a minus 325 mesh (Tyler) powder. After calcination, the metakaolin should be pulverized if the discharge product from the calciner is in the form of aggregates. The metakaolin powder may be present as a mixture with some calcined clay that has undergone or passed through the kaolin exotherm at about 1,800° F. It is also within the scope of the invention to employ metakaolin which contains some hydrated kaolin clay. Commercial metakaolin pigments, exemplified by the product supplied as "Satintone No. 2" may be used.

The metakaolin is preferably obtained from a hydrated (raw) clay that is low in iron.

Representative samples of powdered metakaolin have average particle sizes below 10 microns (equivalent spherical diameter). Typical commercial metakaolin pigments have average particle diameters within the range of 2 to 5 microns.

The starting materials employed in producing the calcined microspheres is a micron-size (powdered) clay material selected from the group consisting of hydrated kaolin clay and mixtures of hydrated kaolin clay and calcined kaolin clay. The use of a fine size, low-iron plastic hydrated kaolin clay, i.e., a clay containing a substantial quantity of submicron size particles, is preferred. The use of such clay generally contributes to the provision of catalysts of superior attrition-resistance. Any powdered calcined clay employed in the preparation of the microspheres may be obtained by calcining pulverized high purity, low iron kaolin clay at a product temperature within the range of about 1,000° to 2,200° F., preferably 1,350° F. to 2,000° F. Mixtures of clays calcined at temperatures within these ranges may be employed. The calcined clay constituent may be amorphous when tested by standard X-ray diffraction although diffraction maxima characteristic of crystalline impurities such as anatase may be present. It is within the scope of the invention to include in the slurry a calcined clay which has been calcined under conditions such that an X-ray diffraction pattern of the calcined clay contains peaks characteristic of mullite.

In preparing the microspheres, suggested proportions are from 0 to 100 parts by weight powdered calcined kaolin clay (moisture-free basis) to 100 parts by weight of powdered hydrated kaolin.

To facilitate spray drying of the slurry to form the desired microspheres, the powdered hydrated clay (or mixture thereof with calcined clay) is preferably dispersed in water in the presence of a small amount of a deflocculating agent exemplified by a sodium condensed phosphate salt such as tetrasodium pyrophosphate. A sodium condensed phosphate may be employed in amount within the range of about 0.1 to 0.5 percent based on the dry weight of the clay material in the slurry. Other deflocculating agents such as sodium silicate may be used. By employing a deflocculating agent, spray drying may be carried out at higher solids levels and harder products are usually obtained. When a deflocculating agent is employed, slurries containing about 55 to 65 percent solids may be prepared. Such slurries are preferred to 40 to 50 percent slurries which do not contain a deflocculating agent. Generally speaking, higher solids slurries may be prepared when all of the clay is in hydrated (uncalcined) condition than when mixtures of hydrated and calcined kaolin clays are employed. Thus, the use of hydrated kaolin clay as the sole clay material in combination with the use of a deflocculating agent is especially preferred.

Other ingredients such as, for example, combustible fillers, may also be present in the slurry.

Several procedures can be followed in mixing the ingredients to form the slurry. One procedure, by way of example, is to dry blend the finely divided solids, add the water and then incorporate the deflocculating agent. The components can be mechanically worked together or individually to produce slurries of desired viscosity characteristics.

Spray dryers with countercurrent, cocurrent or mixed countercurrent and cocurrent flow of slurry and hot air can be employed to produce the microspheres. The air may be heated electrically or by other indirect means. Combustion gases obtained by burning hydrocarbon fuel in air can be used.

Spray drying results in the evaporation of water from droplets of the slurry and the formation of microspheres. Microspheres about 20 to 150 microns in equivalent spherical diameter are desired for most catalytic operations using fluidized contact masses.

Using a cocurrent dryer, air inlet temperatures to 1,200° F. may be used when the clay feed is charged at a rate sufficient to produce an air outlet temperature within the range of 250° to 600°F. At these temperatures, free moisture is removed from the slurry without removing water of hydration (water of crystallization) from the raw clay ingredient. Dehydration of some or all of the raw clay during spray drying is, however, within the scope of the invention. The spray dryer discharge may be fractionated to recover microspheres of desired particle size.

The microspheres obtained by the spray drying operation are calcined at a temperature and for a time such that the hydrated kaolin clay in the microspheres undergoes substantially or completely the characteristic kaolin clay exothermic reaction at about 1,800° F. Generally, a calcination atmosphere of at least 1,800° F., preferably in excess of 1,850° F., is used. In batch operation it is possible to employ a substantially constant calcination temperature which may be, for example, within the range of about 1800° to 2100° F. In a continuous calciner such as for example a rotary calciner with countercurrent flow of combustion gases of the type described in U. S. Pat. No. 3,383,438 to Allegrini et al, the gas and product temperatures vary throughout the length of the calciner. When using such a calciner, air inlet temperatures may vary within the range of 2,000° F. to 2,400° F. Corresponding product temperatures may be within the range of about 1,850° to 2,000° F. The product temperature during calcination may be controlled to provide a product which provides an X-ray pattern free from strong lines (except for the possible presence of lines diagnostic for clay impurities). It is within the scope of the present invention to calcine the microspheres under conditions of temperature and time sufficiently severe to produce microspheres which produce an X-ray pattern having strong lines diagnostic for mullite. It is presently believed that calcination conditions should not be sufficiently severe to cause the crystallization of a substantial proportion of cristobalite.

After calcination the microspheres should be cooled and fractionated, if required.

The powdered metakaolin and microspheres are formed into an aqueous suspension by mixing them with sodium hydroxide solution. Any order of addition may be followed when making up the suspension.

The suspension is formulated to include proportions of $Na_2O$, $SiO_2$, $Al_2O_3$ and $H_2O$ which will result in the crystallization of a desired percentage of faujasite zeolitic molecular sieve. In formulating the suspension, the sodium hydroxide solution must be employed in amount which will result in the formation of a suspension which is sufficiently fluid to be stirred; this suspension must contain sufficient $Na_2O$ at an operable concentration to crystallize the desired faujasite zeolite. Recommended is the use of sufficient sodium hydroxide solution to provide from about 0.3 to 1.1 moles $Na_2O$ per mole $Al_2O_3$ in the mixture of powdered metakaolin and calcined microspheres. Sodium hydroxide solutions of about 10 percent to 22 percent concentration (w/w) are recommended. Solutions of 14 to 19 percent concentration are preferred. When the concentration is too high, there may be insufficient liquid to produce a fluid suspension without employing a $Na_2O/Al_2O_3$ molar ratio that is excessively high and results in a zeolite having an undesirably low $SiO_2/Al_2O_3$ molar ratio. When employing the presently preferred sodium hydroxide solutions of 14 to 19 percent concentration, the preferred proportion of solution to combined metakaolin and microspheres is such that the $Na_2O/Al_2O_3$ mole ratio in the reaction suspension is within the range of 0.6 to 0.8/1.

The powdered metakaolin is employed in amount within the range of about 2 to 35 percent, based upon the combined weight of the powdered metakaolin and the calcined microspheres. A low ratio of metakaolin to calcined kaolin clay that has undergone the exotherm favors the crystallization of zeolite Y. Zeolite X is obtained as the ratio is increased. When too much metakaolin is present, the desired crystalline product may not be obtained even when the hydrothermal treatment is carried out for long periods of time, e.g., 48 hours or more. On the other hand, when too little metakaolin is present in the reaction liquid, the quantity of zeolite that crystallizes may be less than desired. This is especially true if the calcined clay in the microspheres has passed completely through the kaolin exotherm. Generally, the use of metakaolin in amount within the range of 5 to 10 percent of the combined weight of the solid reactants is recommended.

The microspheres and the finely divided metakaolin undergo an exothermic reaction with the sodium hydroxide solution in which they are suspended suspended when the suspension is agitated at least intermittently and maintained at a temperature within the range of about 65° F. to about 130° F. for a time within the range of about 6 to 48 hours. During the reaction, silica is extracted from the solids in the suspension and appears in the mother liquor. The sodium oxide content of the reaction liquid undergoes a decrease. Excellent results have been obtained when the suspensions were aged at a temperature of 100° F. for times within the range of 12 to 24 hours. Crystallization does not take place during this phase of the hydrothermal treatment.

To crystallize the zeolite the temperature of the suspension is increased to about 150° to 200° F. and maintained under at least intermittent agitation. During the crystallization, means should be provided to prevent substantial change in water content due to loss of water from the system. This may be done, for example, by using a closed reactor, by providing the reactor with a water-cooled condensor to condense water which evaporates or, when operating in an open reactor, by adding water as it is lost from the reactor by evaporation. It is also within the scope of the invention to employ an open reactor and cover the aqueous suspension with oil. In this case, the impeller used to agitate the system should be well below the oil layer in order to maintain the oil as a distinct upper layer.

Crystallization time varies with the composition of the reaction mixture and temperature and is usually within the range of 8 to 48 hours at a temperature of about 180° F.

Crystallization should be terminated before an appreciable quantity of a zeolite having the X-ray diffraction pattern of zeolite B forms. When such zeolite forms, the proportion of faujasite in the product decreases.

Only a portion of the constituents of the calcined microspheres reacts to form the zeolitic molecular sieve and thus a composite of crystalline sieve and an alumina-silica residue is present in the crystallized microspheres. Generally speaking, after crystallization the microspheres should contain above 15 percent crystalline faujasite-type zeolite, most preferably above 20 percent zeolite. The term "faujasite-type zeolite" embraces zeolite X and zeolite Y. Preferably, the high silica form of sodium zeolite Y is crystallized, especially sodium zeolite Y having a $SiO_2/Al_2O_3$ molar ratio in excess of 4.0. X-ray diffraction techniques that may be used to estimate zeolite quantity, distinguish zeolite X from zeolite Y, and determine the silica-to-alumina molar ratios of zeolite Y appear in U. S. Pat. No. 3,391,994. As mentioned, silica is extracted from the calcined clays during reaction and a sodium silicate mother liquor forms. After crystallization a typical mother liquor analyzes about 14 percent (wt.) $SiO_2$, 7 percent $Na_2O$ and 0.5 percent $Al_2O_3$.

After reaction and recrystallization, the microspheres are separated from the mother liquid by suitable means such as decantation. Powdered residue of the metakaolin reactant and the residue of any microspheres which may have been disintegrated during aging or crystallization are removed with the supernatant. The reacted suspension may be passed through screens having openings of suitable dimensions to separate powdered residue from the crystallized microspheres.

The microspheres are optionally washed with water to remove all mother liquid or up to about 30 percent by weight of the mother liquor may be retained by omitting the wash step or by carrying out the washing with insufficient water to remove all of the liquor. The $SiO_2/Al_2O_3$ molar ratio of the reacted microspheres is generally in excess of 1/1 and will vary, of course, depending upon reactants, the reaction conditions and on the amount of mother liquor retained with the microspheres after they are separated from the mother liquor. For example, in one test the microspheres were separated from mother liquor and then washed with dilute sodium hydroxide solution to prevent precipitation of silica in the mother liquor. The washed and exchanged microspheres had a $SiO_2/Al_2O_3$ of 1.09. When another sample of the microspheres was merely washed with a small amount of distilled water after they were separated from mother liquor, the microspheres had a $SiO_2/Al_2O_3$ of 1.25 before ion-exchange. The $SiO_2/Al_2O_3$ was 1.23 after the partially washed microspheres were ion-exchanged with ammonium nitrate solution to a $Na_2O$ of 0.83 percent.

After mother liquor is removed, exchangeable sodium ions in the microspheres are exchanged for more suitable nonalkali metal cations such as, for example, ammonium, hydrogen, magnesium, calcium, rare earth metals or mixtures thereof. The exchanged microspheres are dried and then activated by air calcination, steaming or both. It is within the scope of the invention to activate the ion-exchanged microspheres in a catalytic cracking unit during use of the catalyst.

EXAMPLE I

The following tests were carried out to demonstrate advantages of including a small amount of powdered metakaolin with calcined microspheres composed of kaolin that had undergone the kaolin exotherm when the microspheres were calcined.

Calcined spray dried microspheres composed predominantly of kaolin clay which had undergone the characteristic kaolin exotherm were used in a control run without added metakaolin (Test A). In Test B and C powdered metakaolin was incorporated with such microspheres, in accordance with the present invention.

The calcined microspheres were prepared as follows from "HT" clay (a fine size fraction of hydrated Georgia kaolin clay, corresponding to a No. 2 paper coating grade). An aqueous slurry of the "HT" clay was deflocculated with tetrasodium pyrophosphate in amount of 0.3 percent based on the moisture-free weight of the clay. The ingredients were thoroughly mixed, producing a fluid deflocculated slip containing 60 percent solids. The slip was spray dried in a 5 × 5 ft. gas-fired spray dryer using an atomizer wheel speed of 16,760 r.p.m. Air inlet and outlet temperatures were approximately 1,100° and 450°F., respectively. A 10 lb. sample of the spray dried microspheres was screened and a minus 60 mesh (Tyler) fraction was recovered. The screened microspheres were charged to silica trays which were maintained in a muffle furnace for 2 hours at 1,800° F. The resulting porous calcined microspheres consisted largely of calcined kaolin clay which had undergone the characteristic exotherm and were essentially free from metakaolin and hydrated kaolin clay.

In carrying out Test A, 150 gm. of the calcined clay microspheres was gradually charged to 240 gm. of a 16.7 percent (w/w) sodium hydroxide solution in a 500 ml. Erlenmeyer flask. The mole proportion of $Na_2O$ in the solution to $Al_2O_3$ in the microspheres was 0.74.

Test B (the process of the present invention) was carried out by adding 142.5 gm. of the calcined microspheres to 240 gm. of the 16.7 percent sodium solution in another flask. After addition of the microspheres, 7.5 gm. "Satintone No. 2," a commercial metakaolin pigment, was gradually charged to the reactor. The $Na_2O/Al_2O_3$ ratio of the reactants was 0.74 to 1.

In Test C, also in accordance with the present invention, the procedure of Tests A and B was followed using 135 gm. microspheres, 15 gm. "Satintone 02" and 240 gm. of the 16.7 percent caustic solution.

In order to control the temperature of the contents of the flask and to maintain the microspheres in suspension, the flasks were mounted in an Eberbach Water Bath Shaker (table model) provided with means to control the temperature of the water in the bath surrounding the flasks. Before the caustic solution was charged to a flask, the water bath had been heated to 100° F. The shaker was in operation before the microspheres and metakaolin were incorporated into the caustic solution.

After the flasks were charged, as described above, they were sealed with rubber stoppers provided with a thin glass tube vent.

The three flasks were maintained (aged) in the 100° F. water bath for 12 hours. The temperature of the water bath was then increased to 180° F. and the flasks were held in the bath for an additional 12 hours to crystallize the zeolite. The flasks were continuously shaken during the aging (100° F.) and crystallizing (180° F.) treatments.

At the end of this period, the flasks were removed from the shaker and distilled water was added to the flasks. The mother liquor was decanted and the solids were then filtered on Buchner funnels through nylon filter cloth.

The filter cakes were washed with distilled water and the zeolite content of a sample of the washed product was obtained. The washed material was ion-exchanged with 1N $NH_4NO_3$ solution to a $Na_2O$ content less than 1 percent and dried.

All X-ray diffraction patterns were obtained by the procedure and with the equipment described in U. S. Pat. No. 3,391,994. The percentage of zeolite Y refers to values obtained from X-ray diffraction data using calculations described in said patent.

Samples of the 100/270 mesh fraction of the ion-exchanged microspheres were then calcined in a muffle furnace at 1,550° F. for 4 hours.

Hardness (attrition-resistance) of the microspheres was measured as follows.

A volume of the heat-treated catalyst (0.661 cc.) and 0.5 gm. of 14/20 mesh (U. S. Standard Sieve) silica sand was placed in a 2 cc. vial of a Wig-L-Bug grinding mill and the mill was operated for 5 seconds. (The Wig-L-Bug grinding mill is a product of Spex Industries, and is described in Catalog No. 5,000 of that company.) The sample was then screened and the percentage of minus 325 mesh material was reported as the percent weight loss. The test was repeated in 5 second increments on the plus 325 mesh portions of the remainder of the sample. A plot of percent weight loss vs. time was obtained. The slope of the curve at 20 percent loss was designated the "attrition rate." Commercial fluid zeolitic catalysts considered to have outstanding hardness have attrition values below 1.5 percent by this procedure.

The bulk density of a sample of the calcined ion-exchanged microspheres was measured to determine the effect of the addition of powdered metakaolin.

Results are summarized in Table I.

TABLE I

Effect of Using Powdered Metakaolin Reactant on Properties of Fluid Zeolitic Cracking Catalyst Obtained from Preformed Calcined Kaolin Microspheres

| Reactants, parts by weight | Test A (control) | Test B | Test C |
|---|---|---|---|
| Metakaolin | 0 | 7.5 | 15 |
| Calcined microspheres | 150 | 142.5 | 135 |
| NaOH soln., 16.7% conc. | 240 | 240 | 240 |
| Composition of Crystallized Product | | | |
| Zeolite Y, % | 19 | 22 | 28 |
| Physical Properties of Product | | | |
| Attrition resistance, %/sec. | 1.05 | 0.80 | 0.50 |
| Bulk density, gm./cc. | 0.85 | 0.90 | 0.97 |

The data show that by incorporating metakaolin into the suspension of preformed calcined kaolin microspheres in caustic solution the percentage of zeolite Y was increased. The data show that the attrition-resistance was improved to a noteworthy extent and bulk density was also increased.

EXAMPLE II

This example describes the outstanding catalytic properties of a cracking catalyst prepared by the method of the invention.

A fine size fraction of high purity hydrated Georgia kaolin clay ("HT") was formed into a 62.5 percent solids deflocculated aqueous slip by agitating the clay in water in the presence of tetrasodium pyrophosphate in amount of 0.30 percent of the clay weight. The slip was spray dried to produce microspheres, as in Example I. The microspheres were calcined in a continuous rotary calciner of the type described in the Allegrini et al patent (supra). The air inlet temperature during calcination was in the range of 2,150° to 2,250° F. After the microspheres had cooled, a 2,299 lb. portion was blended with 121 lb. of the metakaolin pigment used in Example I. The mixture was gradually added to 3,865 lb. of a 15.0 percent (w/w) aqueous solution of sodium hydroxide in a 500 gallon reactor. The ingredients were mixed and aged at 100° F. for 12 hours and then maintained at about 180° F. for 16 hours. During aging and crystallization, the reactor was covered with a loosely fitting cover. Agitation was intermittent during aging and crystallization. After the reacted mixture had cooled, it was centrifuged to remove mother liquor and suspended fine particles.

The residue from the centrifuge was repulped in water and again centrifuged. This product contained 26 percent zeolite Y having a $SiO_2/Al_2O_3$ of 4.62. A portion of the residue from the centrifuge was exchanged batchwise with 2N $NH_4NO_3$ to a sodium oxide content of 1.14 percent. The exchanged product was water washed and air dried at room temperature.

The bulk density of a 200/270 mesh fraction of the sample (after being calcined at 1,100° F.) was 0.926 g./cc.

The dried product had an L.O.I. (loss on ignition at 1,800° F.) of 24.74 percent and a chemical analysis as follows:

| | Wt. % (V.F.* Basis) |
|---|---|
| $Na_2O$ | 1.14 |
| $Al_2O_3$ | 56.03 |
| $SiO_2$ | 40.07 |
| $Fe_2O_3$ | 0.38 |
| $TiO_2$ | 2.29 |

*V.F. = volatile free weight basis, determined by heating material to essentially constant weight at 1800° F.

Hardness by the "Wig-L-Bug" test was 0.50 percent/sec. A comparison of this value with those of commercially available fluid cracking catalysts shows that the catalyst of the invention had outstanding resistance to attrition.

A sample of dried ion-exchanged microspheres was pelletized with "Sterotex" binder and the pellets were activated by heating at 1,350° F. for 4 hours in an atmosphere of 100 percent steam. Catalytic properties were tested by the "Cat-D" procedure at a liquid hourly space velocity (LHSV) of 3.0.

To test the thermal stability, a portion of the steamed catalyst was calcined at 1,500° F. for 4 hours in 100 percent steam and then tested by the "Cat-D" method. Results are summarized in Table II.

TABLE II

Catalytic Properties of Zeolitic Cracking Catalyst

| Heat Treatment (steam) | 1350° F./4 hr. | 1500° F./4 hr. |

| | | |
|---|---:|---:|
| Gasoline, Vol. % | 53.8 | 61.1 |
| Coke, Wt. % | 8.62 | 2.66 |
| Gas, Wt. % | 30.1 | 15.2 |
| Gas Gravity | 1.66 | 1.58 |
| Conversion, Wt. % | 84.0 | 68.7 |

Data in Table II show that the catalyst had outstanding selectivity towards gasoline, low coking properties and excellent stability towards high temperature steam.

We claim:

1. A method for preparing a zeolitic molecular sieve catalyst in the form of attrition-resistant microspheres which comprises forming a suspension comprising (a) mechanically strong microspheres comprising calcined kaolin clay which has undergone the kaolin exotherm, said microspheres being free from hydrated clay, (b) powdered metakaolin and (c) an aqueous solution of sodium hydroxide, aging the suspension, subjecting it to agitation, heating the suspension while under agitation until faujasite-type zeolite crystals form in said microspheres and a sodium silicate mother liquor is formed, separating microspheres comprising crystalline sodium faujasite zeolite from an aqueous phase of the suspension and reducing the sodium content of the microspheres by ion-exchanging them with nonalkali metal cations.

2. The method of claim 1 wherein said metakaolin is incorporated in amount within the range of 2 percent to 35 percent based on the combined weight of metakaolin and microspheres.

3. The method of claim 1 wherein said metakaolin is incorporated in amount within the range of 5 percent to 10 percent based on the combined weight of metakaolin and microspheres.

4. The method of claim 1 wherein the sodium hydroxide solution has a concentration within the range of 10 percent to 22 percent.

5. The method of claim 1 wherein the sodium hydroxide solution has a concentration within the range of 14 percent to 19 percent.

6. The method of claim 5 wherein the sodium hydroxide solution is used in amount to provide from 0.6 to 0.8 mole $Na_2O$ per mole $Al_2O_3$ in the metakaolin and microspheres.

7. A zeolitic molecular sieve catalyst prepared in accordance with the method of claim 1.

* * * * *

UNITED STATES PATENT OFFICE
CERTIFICATE OF CORRECTION

Patent No. 3,663,165             Dated May 16, 1972

Inventor(s) Walter L. Haden, Jr. and Frank J. Dzierzanowski

It is certified that error appears in the above-identified patent and that said Letters Patent are hereby corrected as shown below:

Column 5 - line 18, ". . . in which they are suspended suspended" should read -- in which they are suspended --; line 68, ". . . and recrystallization, . . ." should read -- and crystallization --.

Column 7 - line 1, "15 gm. "Satintone 02" should read -- 15 gm. Satintone No. 2 --.

Signed and sealed this 7th day of November 1972.

(SEAL)
Attest:

EDWARD M. FLETCHER, JR.
Attesting Officer

ROBERT GOTTSCHALK
Commissioner of Patents